(12) United States Patent
Moon

(10) Patent No.: US 11,407,376 B2
(45) Date of Patent: Aug. 9, 2022

(54) METHOD OF FOLDING FAR-SIDE AIRBAG

(71) Applicant: HYUNDAI MOBIS CO., LTD., Seoul (KR)

(72) Inventor: Geon Woong Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 288 days.

(21) Appl. No.: 16/911,768

(22) Filed: Jun. 25, 2020

(65) Prior Publication Data
US 2020/0406854 A1    Dec. 31, 2020

(30) Foreign Application Priority Data

Jun. 26, 2019    (KR) .................. 10-2019-0076177

(51) Int. Cl.
| | | |
|---|---|---|
| *B60R 21/237* | (2006.01) | |
| *B60R 21/231* | (2011.01) | |
| *B60R 21/2338* | (2011.01) | |

(52) U.S. Cl.
CPC ........ *B60R 21/237* (2013.01); *B60R 21/2338* (2013.01); *B60R 21/23138* (2013.01); *B60R 2021/23382* (2013.01)

(58) Field of Classification Search
CPC ............ B60R 21/237; B60R 21/23138; B60R 21/2338; B60R 2021/23382
See application file for complete search history.

(56) References Cited

U.S. PATENT DOCUMENTS

| | | | | |
|---|---|---|---|---|
| 5,765,863 A * | 6/1998 | Storey | ................... | B60R 21/207 280/743.1 |
| 6,110,094 A * | 8/2000 | Wallentin | ........... | B61D 27/0018 493/454 |
| 6,186,534 B1 * | 2/2001 | Heinz | ................... | B60R 21/237 280/743.1 |
| 6,231,070 B1 * | 5/2001 | Sunabashiri | .......... | B60R 21/237 280/730.2 |
| 8,136,837 B2 * | 3/2012 | Feller | .................... | B60R 21/237 280/743.1 |
| 8,360,466 B2 * | 1/2013 | Kino | ..................... | B60R 21/237 280/730.2 |
| 8,540,276 B2 * | 9/2013 | Schneider | ............. | B60R 21/237 280/743.1 |
| 10,017,148 B2 * | 7/2018 | Hayashi | ................ | B60R 21/237 |
| 10,369,957 B2 * | 8/2019 | Hatakeyama | ......... | B60R 21/207 |
| 11,155,232 B2 * | 10/2021 | Moon | ............... | B60R 21/23138 |
| 2008/0174093 A1 * | 7/2008 | Inoue | ............... | B60R 21/23138 280/730.2 |
| 2021/0309178 A1 * | 10/2021 | Moon | ................... | B60R 21/237 |

FOREIGN PATENT DOCUMENTS

DE        102008029810 A1 * 12/2009     ............. B60R 21/20

* cited by examiner

*Primary Examiner* — Jonathan Ng
*Assistant Examiner* — Joselynn Y Sliteris
(74) *Attorney, Agent, or Firm* — NovoTechIP International PLLC

(57) ABSTRACT

Disclosed herein is a method of folding a far-side airbag, which includes forming a first folding part in such a manner that an upper side of an airbag seat is folded inboard, forming a second folding part by folding both widthwise sides of the airbag seat, forming a third folding part by folding the upper side of the airbag seat, forming a roll-folding part by roll-folding the upper side of the airbag seat, forming an overlapping part by folding over an inflator of the airbag seat, and folding the roll-folding part so that the roll-folding part overlaps the overlapping part.

9 Claims, 10 Drawing Sheets

METHOD OF FOLDING FAR-SIDE AIRBAG

CROSS-REFERENCE TO RELATED APPLICATION

This application claims priority from and the benefit of Korean Patent Application No. 10-2019-0076177, filed on Jun. 26, 2019, which is hereby incorporated by reference for all purposes as if set forth herein.

BACKGROUND

Field

Exemplary embodiments of the present disclosure relate to a method of folding a far-side airbag, and more particularly, to a method of folding a far-side airbag, which is capable of preventing an airbag cushion from interfering with a driver's body and/or a passenger's body at the time of deployment of the airbag cushion.

Discussion of the Background

In general, airbags are installed in a vehicle to protect occupants. The airbags are installed in various locations depending on the body part to be protected. A far-side airbag is placed between a driver's seat and a passenger's seat. In the event of vehicle side impact, the far-side airbag is deployed upward to prevent a driver and a passenger next thereto from colliding with each other. The far-side airbag is large in size and volume so as not to bend toward the passenger seat when the passenger seat is empty.

The far-side airbag conventionally includes a cushion whose lower end is very wide in order to restrain a driver's torso. Hence, in the case where the far-side airbag is folded inboard, the far-side airbag may interfere with the driver's arm and torso during deployment.

In addition, in the case where the far-side airbag is folded, at the upper side thereof, outboard in order to avoid interference between the airbag and the driver's arm and torso or control the deployment direction of the airbag, the far-side airbag may be deployed in a wrong direction or not be deployed, due to interference with a passenger's body while the airbag is being deployed.

Therefore, it is necessary to improve these issues.

SUMMARY

Various embodiments are directed to a method of folding a far-side airbag, which is capable of preventing an airbag cushion from interfering with a driver's body and/or a passenger's body at the time of deployment of the airbag cushion.

In an embodiment, there is provided a method of folding a far-side airbag, which includes forming a first folding part in such a manner that an upper side of an airbag seat is folded inboard, forming a second folding part by folding both widthwise sides of the airbag seat, forming a third folding part by folding the upper side of the airbag seat, forming a roll-folding part by roll-folding the upper side of the airbag seat, forming an overlapping part by folding over an inflator side of the airbag seat, and folding the roll-folding part so that the roll-folding part overlaps the overlapping part.

In the forming the second folding part, the second folding part may be folded inboard.

In the forming the second folding part, one second folding portion and the other second folding portion of the second folding part may have different widths.

In the forming the third folding part, the upper side of the airbag seat may be folded inboard to form the third folding part.

In the forming the roll-folding part, the upper side of the airbag seat may be roll-folded inboard to form the roll-folding part.

In the folding the roll-folding part, the roll-folding part may be folded toward the outboard side of the overlapping part.

The method may further include, prior to the forming a first folding part, installing a tether in such a manner that an upper side of the tether passes through the airbag seat and both sides of the tether are fixed to the inflator.

In the installing a tether, the tether may pass through inactive regions of the airbag seat and be disposed on the inboard side of the airbag seat via the upper side of the airbag seat.

The inactive regions may be formed at an inner side and an upper end of the airbag seat, respectively, such that the tether passes through the inactive regions.

As apparent from the above description, according to the present disclosure, when gas is injected into the airbag seat, the overlapping part is first unfolded and deployed outboard. Therefore, it is possible to prevent the airbag seat from interfering with the upper body and arm of the driver at the initial stage of deployment.

In addition, since the first to third folding parts and the roll-folding part are all unfolded and inflated outboard, it is possible to prevent the airbag seat from interfering with the driver's arm and torso while the airbag seat is being deployed.

Furthermore, since the airbag seat is bent by means of the inactive regions and the tether, it is possible to simplify the structure of the airbag seat and reduce the cost to manufacture.

DETAILED DESCRIPTION OF THE ILLUSTRATED EMBODIMENTS

Hereinafter, a method of folding a far-side airbag will be described below with reference to the accompanying drawings through various exemplary embodiments. It should be noted that the drawings are not necessarily to scale and may be exaggerated in thickness of lines or sizes of components for clarity and convenience of description. Furthermore, the terms as used herein are terms defined in consideration of functions of the disclosure and may change depending on the intention or practice of a user or an operator. Therefore, these terms should be defined based on the overall disclosure set forth herein.

Figure 1:
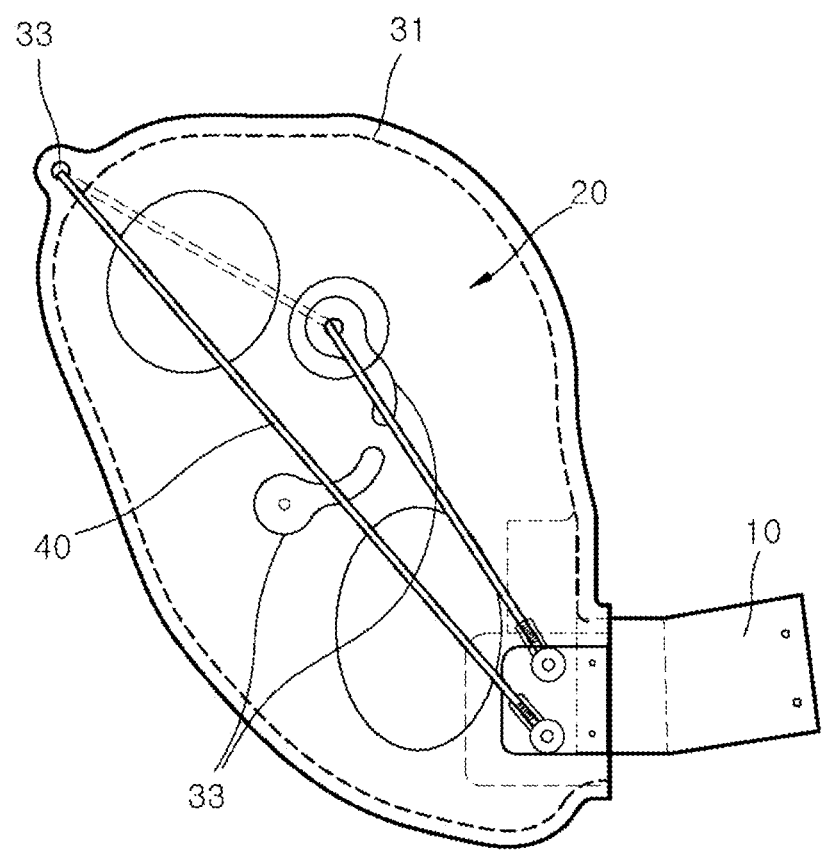
FIG. 1 is a top view illustrating an unfolded state of a far-side airbag according to an embodiment of the present disclosure.
Figure 2:
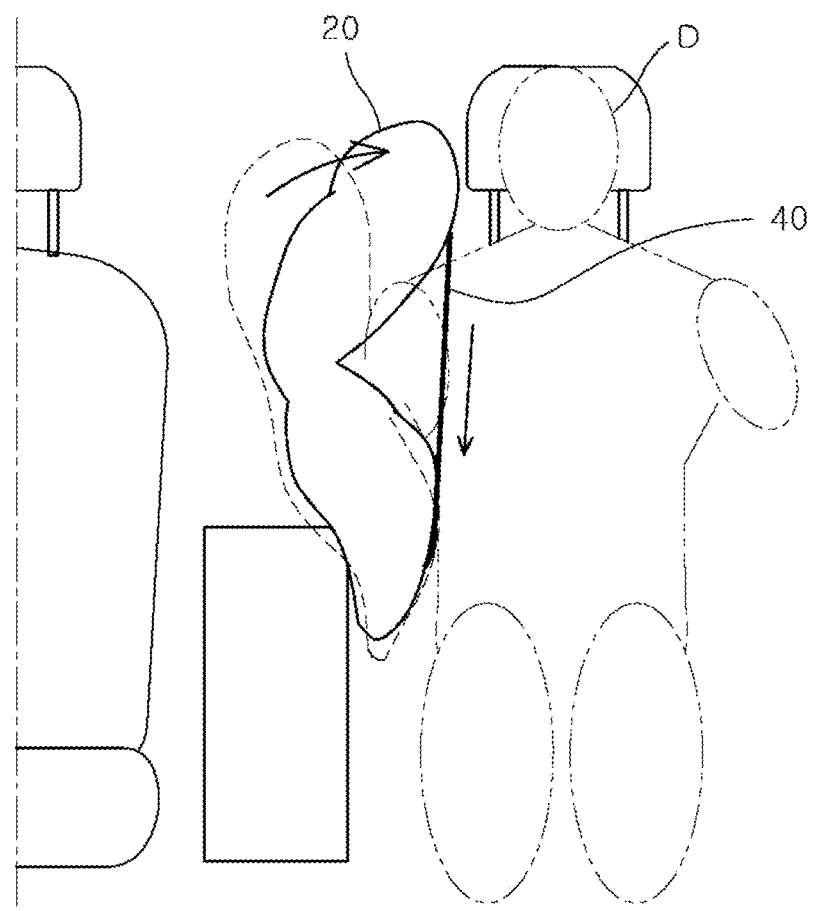
FIG. 2 is a front view illustrating a deployed state of the far-side airbag according to the embodiment of the present disclosure.

FIG. 1 is a top view illustrating an unfolded state of a far-side airbag according to an embodiment of the present disclosure. FIG. 2 is a front view illustrating a deployed state of the far-side airbag according to the embodiment of the present disclosure.

Referring to FIGS. 1 and 2, the far-side airbag according to the embodiment of the present disclosure includes an airbag seat 20 and a tether 40.

A fixed stud 10 is connected to the lower side of the airbag seat 20. The fixed stud 10 is formed with a stud hole (not shown). The circumference of the airbag seat 20 is sewn by an edge sewing yarn 31. When gas is injected into the airbag seat 20, the airbag seat 20 is inflated and deployed to become an airbag cushion (not shown).

The tether 40 is installed such that both sides thereof are fixed to or near the fixed stud 10 and the upper side thereof passes through the airbag seat 20. For example, inactive regions 33 with no gas injected are formed near the center of the airbag seat 20 and at the upper end thereof, respectively, and the tether 40 is disposed on the inboard side of the airbag seat 20 via the upper side of the airbag seat 20 after passing through the inactive regions 33. That is, the upper side of the tether 40 is disposed on the outboard side of the airbag seat 20, and both ends of the tether 40 are disposed on the inboard side of the airbag seat 20.

Accordingly, the airbag seat 20 is unfolded and deployed outboard until the tensile force of the tether 40 is not applied to the airbag seat 20, so that the airbag seat 20 does not interfere with the arm and upper body of a driver D. On the other hand, when the tensile force of the tether 40 is applied to the airbag seat 20, the airbag seat 20 is pulled inboard by the tether 40 and bent relative to the central inactive region 33. Thus, when the airbag seat 20 is fully deployed, it comes into contact with the head, shoulder, and upper body of the driver D.

A method of folding the far-side airbag, according to the embodiment of the present disclosure, configured as described above will be discussed.

Figure 3A:
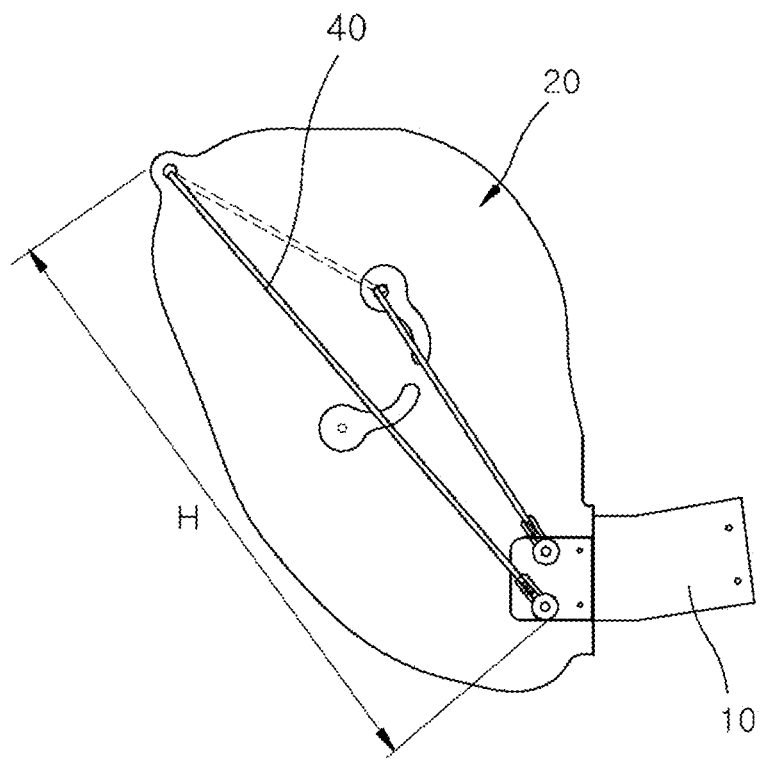
FIGS. 3A and 3B are a top view illustrating a process of folding a first folding part of an airbag seat in the far-side airbag according to the embodiment of the present disclosure.
Figure 3B:
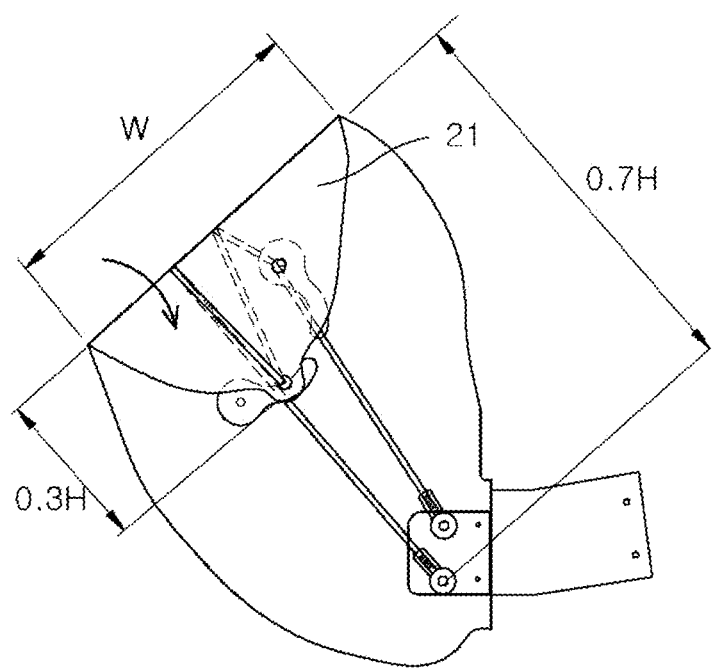
Figure 4A:
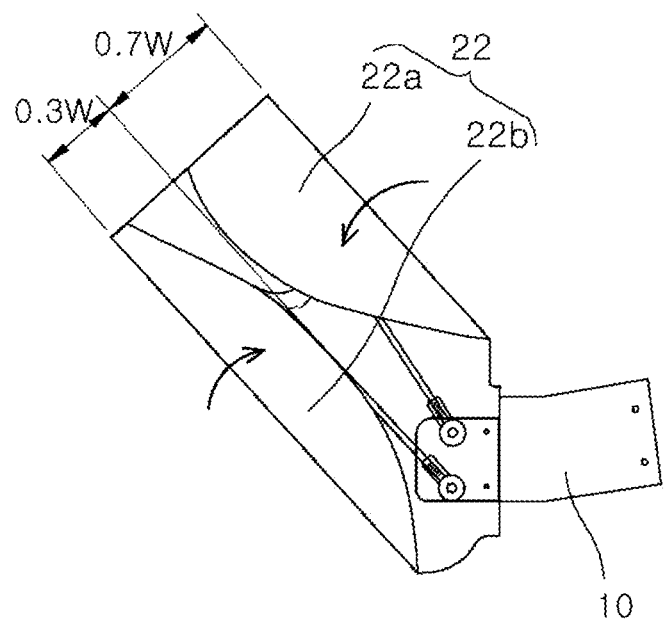
FIGS. 4A to 4C are a top view illustrating a process of folding a second folding part, a third folding part, and a roll-folding part of the airbag seat in the far-side airbag according to the embodiment of the present disclosure.
Figure 4B:
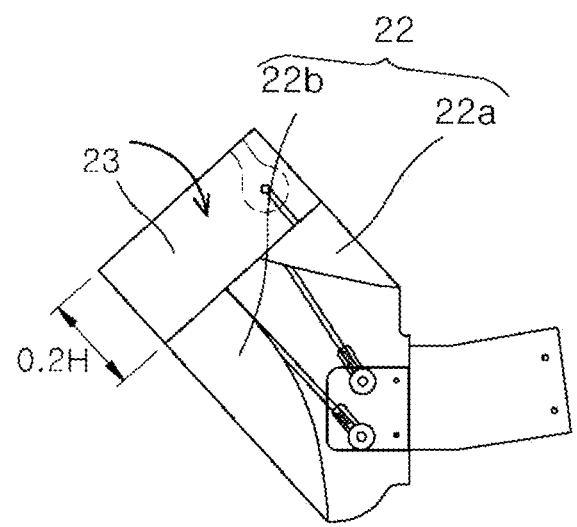
Figure 4C:
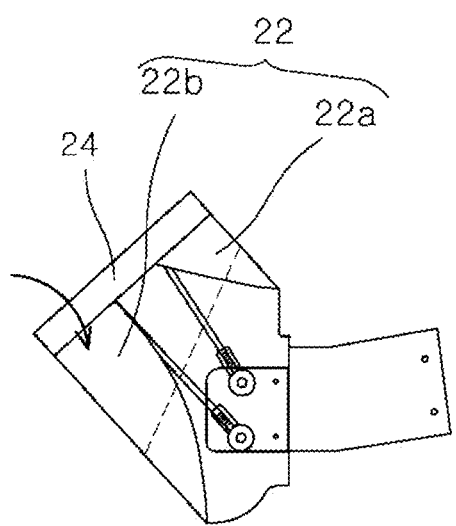
Figure 5A:
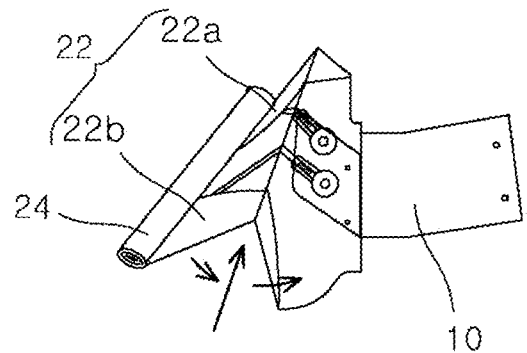
FIGS. 5A to 5C are a top view illustrating a process of folding an overlapping part in the far-side airbag according to the embodiment of the present disclosure.
Figure 5B:
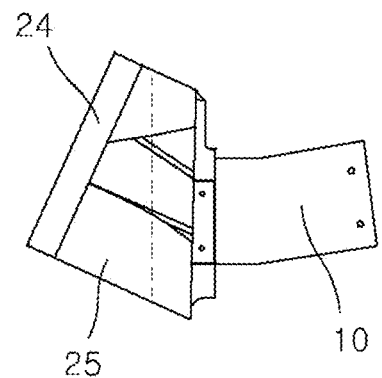
Figure 5C:
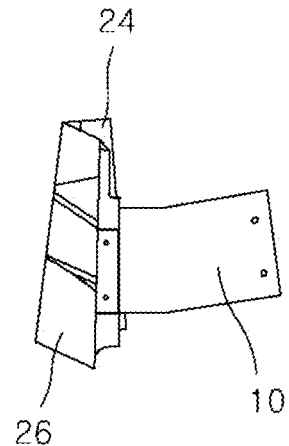
Figure 6A:
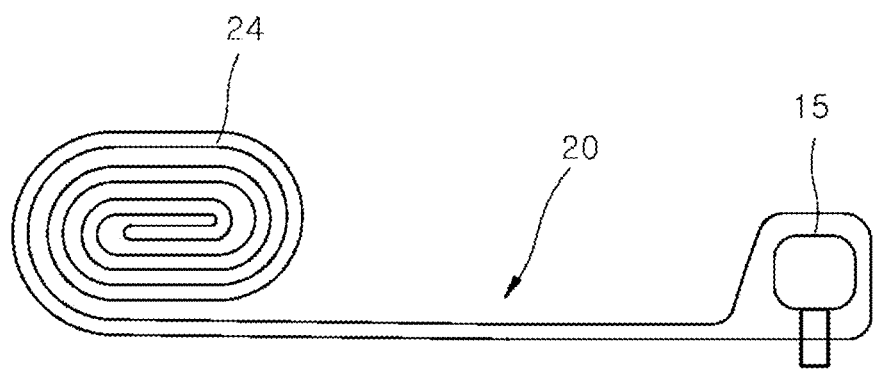
FIGS. 6A and 6B are a side view illustrating the process of folding the overlapping part in the far-side airbag according to the embodiment of the present disclosure.
Figure 6B:
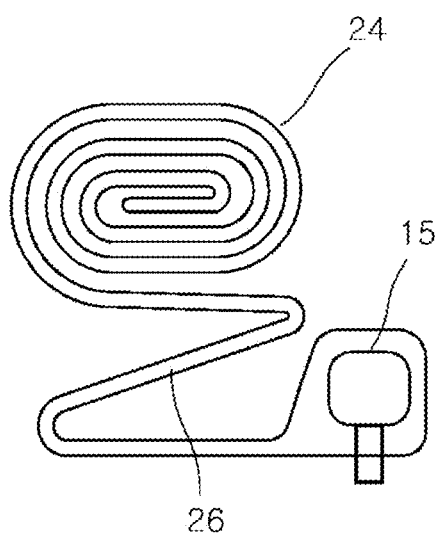
Figure 7A:
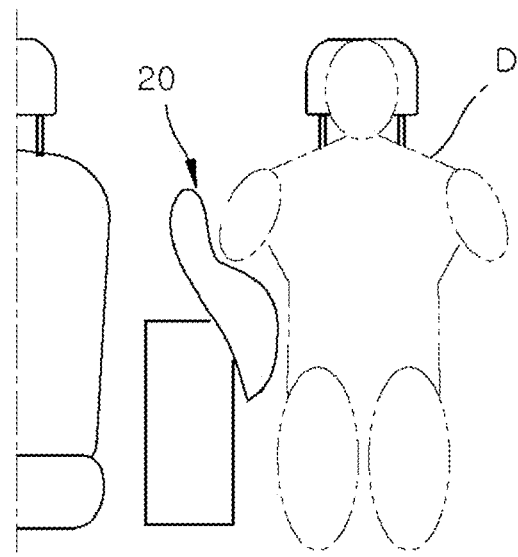
FIGS. 7A to 7E are a front view illustrating a process of deploying an airbag cushion in the far-side airbag according to the embodiment of the present disclosure.
Figure 7B:
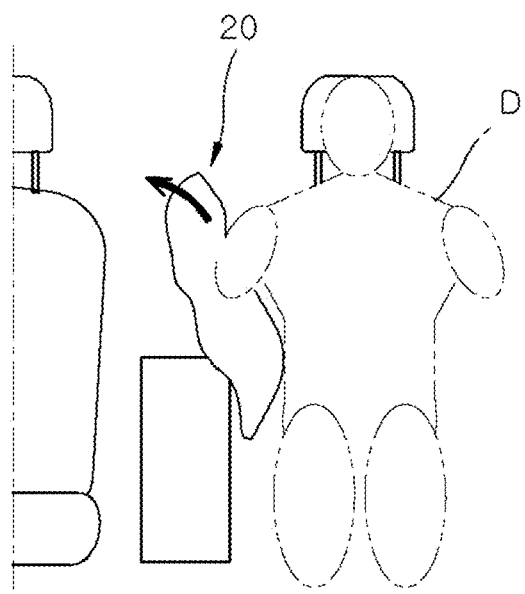
Figure 7C:
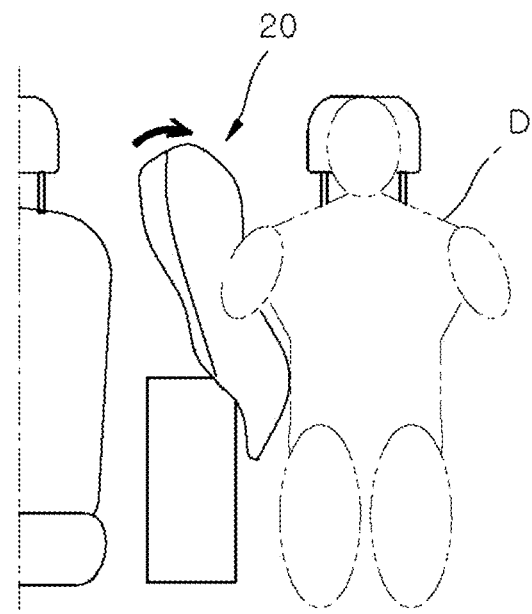
Figure 7D:
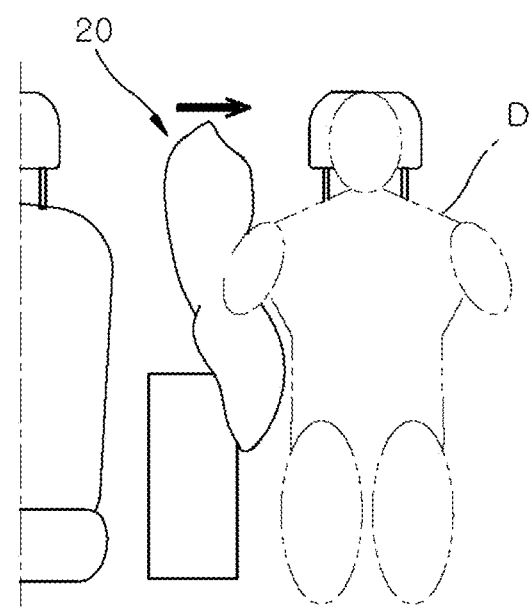
Figure 7E:
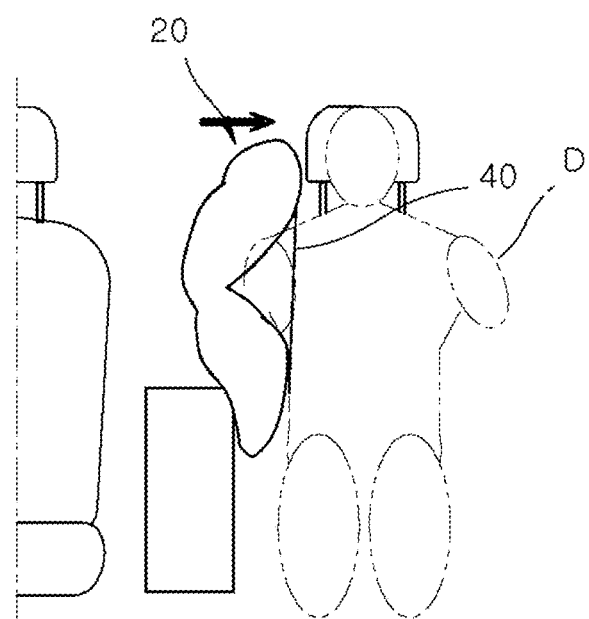

FIGS. 3A and 3B are a top view illustrating a process of folding a first folding part of the airbag seat in the far-side airbag according to the embodiment of the present disclosure. FIGS. 4A to 4C are a top view illustrating a process of folding a second folding part, a third folding part, and a roll-folding part of the airbag seat in the far-side airbag according to the embodiment of the present disclosure. FIGS. 5A to 5C are a top view illustrating a process of folding an overlapping part in the far-side airbag according to the embodiment of the present disclosure. FIGS. 6A and 6B are a side view illustrating the process of folding the overlapping part in the far-side airbag according to the embodiment of the present disclosure.

Referring to FIGS. 3 to 6, the airbag seat 20 is flattened such that the inboard side of the airbag seat 20 is directed upward. In this case, both sides (indicated by the solid line in FIG. 1) of the tether 40 are disposed on the inboard side of the airbag seat 20, and the intermediate portion (indicated by the dotted line in FIG. 1) of the tether 40 is disposed on the upper outboard side of the airbag seat 20. The total vertical length of the airbag seat 20 is referred to as H.

The method of folding the far-side airbag performs, prior to a first folding step, a tether installation step in which the upper side of the tether 40 passes through the airbag seat 20 and both sides of the tether 40 are fixed to an inflator 15 (see FIG. 6). In the tether installation step, the tether 40 passes through the inactive regions of the airbag seat 20 and is disposed on the inboard side of the airbag seat 20 via the upper side of the airbag seat 20. The inactive regions 33 are formed at the respective inner side and upper end of the airbag seat 20 such that the tether 40 passes through the inactive regions. The inactive regions 33 are formed with tether holes (not shown) through which the tether 40 passes.

There is performed the first folding step of forming a first folding part 21 in such a manner that the upper side of the airbag seat 20 is folded inboard. The first folding part 21 is formed by folding approximately 30% (0.3H) of the vertical length of the airbag seat 20. The first folding part 21 covers the inactive region 33 formed near the center of the airbag seat 20.

There is performed a second folding step of forming a second folding part 22 by folding both widthwise sides of the airbag seat 20. In the second folding step, the second folding part 22 is folded inboard.

In the second folding step, one second folding portion 22a and the other second folding portion 22b of the airbag seat 20 have different widths. For example, in the second folding step, a point is set at which the width ratio of the airbag seat 20 is about 3:7, the one second folding portion 22a is folded such that one end of the airbag seat 20 is placed on a 3:7 imaginary line of the airbag seat 20, and the other second folding portion 22b is folded such that the other end of the airbag seat 20 is placed on the 3:7 imaginary line of the airbag seat 20. In this case, the total width of the airbag seat 20 with the second folding portions 22a and 22b folded is approximately 60% of the maximum width W of the first folding part 21 in the first folding step. In addition, the width of the other second folding portion 22b is approximately 35% of the maximum width of the first folding part 21 in the first folding step.

There is performed a third folding step of forming a third folding part 23 by folding the upper side (where the first folding part 21 is formed) of the airbag seat 20. For example, in the third folding step, the upper side of the airbag seat 20 is folded inboard to form the third folding part 23. The third folding part 23 is formed in such a manner that approximately 20% (0.2H) of the initial total vertical length H of the airbag seat 20 is folded inboard.

There is performed a fourth folding step of forming a roll-folding part 24 by roll-folding the upper side of the airbag seat 20. In the fourth folding step, the upper side of the airbag seat 20 is roll-folded inboard (clockwise) to form the roll-folding part 24. In addition, the roll-folding part 24 is formed by winding the upper side (where the third folding part 23 is formed) of the airbag seat 20. Here, the roll-folding means that the airbag seat 20 is wound like a scroll.

There is performed a fifth folding step of forming an overlapping part 25 by folding over the inflator 15 of the airbag seat 20. In the fifth folding step, the inflator 15 of the airbag seat 20 is folded over in three layers to form the overlapping part 25. In the fifth folding step, the roll-folding part 24 is disposed opposite to the overlapping part 25 (the inflator 15). The overlapping part 25 and the roll-folding part 24 are disposed in parallel on the same plane.

There is performed a sixth folding step of folding the roll-folding part 24 so that the roll-folding part 24 overlaps the overlapping part 25. In FIG. 5, a portion in which the roll-folding part 24 overlaps the overlapping part 25 is designated by reference numeral 26.

In the sixth folding step, the roll-folding part 24 is folded toward the outboard side of the overlapping part 25. Thus, the roll-folding part 24 is disposed beneath the overlapping part 25.

A process of deploying the far-side airbag, according to the embodiment of the present disclosure, configured as described above will be discussed. The airbag seat is deployed in the reverse order of folding described above as gas is injected into the airbag seat.

FIGS. 7A to 7E are a front view illustrating a process of deploying the airbag cushion in the far-side airbag according to the embodiment of the present disclosure.

Referring to FIG. 7, the airbag seat 20 is packaged such that the roll-folding part 24 is placed above the overlapping part 25. When gas is injected into the airbag seat 20, the overlapping part 25 is unfolded and deployed. In this case, the overlapping part 25 is first unfolded and the airbag seat 20 is obliquely deployed outboard. Therefore, it is possible to prevent the airbag seat 20 from interfering with the upper body and arm of the driver D at the initial stage of deployment.

When the overlapping part 25 is fully deployed, the roll-folding part 24 is positioned at a height of the shoulder of the driver D. Subsequently, the roll-folding part 24 of the airbag seat 20 is unfolded and deployed so as to hardly interfere with the upper body and shoulder of the driver D.

In this case, the roll-folding part 24 is folded inboard (clockwise) in the fourth folding step. Accordingly, the roll-folding part 24 is unfolded from downward and then deployed outboard. Since the roll-folding part 24 is formed by winding the section (approximately 0.2H) of the third folding part 23 in the airbag seat 20, the roll-folding part 24 does not reach the passenger even if it is deployed. Thus, it is possible to prevent the passenger from interfering with the airbag seat 20 while the roll-folding part 24 is being deployed.

Next, the third folding part 23 folded inboard is unfolded and inflated. In this case, the third folding part 23 is unfolded and inflated outboard. Since the third folding part 23 is unfolded and inflated outboard, the third folding part 23 hardly interferes with the arm and torso of the driver D.

The second folding part 22 is unfolded and inflated outboard as gas is injected into the second folding part 22. Subsequently, the first folding part 21 is unfolded and inflated outboard as gas is injected into the first folding part 21. Since the second folding part 22 and the first folding part 21 are deployed outboard, the airbag seat 20 is obliquely deployed outboard (toward the passenger seat).

When the airbag seat 20 is further deployed, the tether 40 pulls the upper side of the airbag seat 20 toward the driver D so that the upper side of the airbag seat 20 faces the head of the driver D. Since the inactive region 33, which is not inflated, is formed near the center of the airbag seat 20, the center of the airbag seat 20 is bent as the tether 40 pulls the upper side of the airbag seat 20. In this case, a portion (not shown) for seating the shoulder of the driver D is concave due to the bending of the center of the airbag seat 20. Therefore, it is possible to prevent the shoulder of the driver D from being excessively pressed by the airbag seat 20.

In addition, the upper and lower portions of the airbag seat 20 are inflated more thickly compared to the center of the airbag seat 20. Accordingly, the lower portion of the airbag seat 20 can be sufficiently inflated to support the waist of the driver D, and the upper portion of the airbag seat 20 can be positioned closer to the head of the driver D.

When gas is injected into the airbag seat 20 as described above, the overlapping part 25 is first unfolded and deployed outboard. Therefore, it is possible to prevent the airbag seat 20 from interfering with the upper body and arm of the driver D at the initial stage of deployment.

In addition, since the first folding part 21, the second folding part 22, and the roll-folding part 24 are all unfolded and inflated outboard, it is possible to prevent the airbag seat 20 from interfering with the arm and torso of the driver D while the airbag seat 20 is being deployed. Furthermore, it is possible to simplify the internal structure of the airbag and reduce the weight of the airbag.

The airbag seat 20 can be prevented from interfering with the driver's body and/or the passenger's body during deployment. Therefore, it is possible to secure the deployment capability and protection performance of the airbag seat 20, and so on.

In addition, since the airbag seat 20 is bent by means of the inactive regions 33 and the tether 40, it is possible to simplify the structure of the airbag seat 20 and reduce the cost to manufacture.

Although the exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A method of folding a far-side airbag, comprising:
    forming a first folding part in such a manner that an upper side of an airbag seat is folded inboard;
    forming a second folding part by folding both widthwise sides of the airbag seat;
    forming a third folding part by folding the upper side of the airbag seat;
    forming a roll-folding part by roll-folding the upper side of the airbag seat;
    forming an overlapping part by folding over an inflator side of the airbag seat; and
    folding the roll-folding part so that the roll-folding part overlaps the overlapping part.

2. The method according to claim 1, wherein in the forming the second folding part, the second folding part is folded inboard.

3. The method according to claim 2, wherein in the forming the second folding part, one second folding portion and the other second folding portion of the second folding part have different widths.

4. The method according to claim 1, wherein in the forming the third folding part, the upper side of the airbag seat is folded inboard to form the third folding part.

5. The method according to claim 1, wherein in the forming the roll-folding part, the upper side of the airbag seat is roll-folded inboard to form the roll-folding part.

6. The method according to claim 1, wherein in the folding the roll-folding part, the roll-folding part is folded toward an outboard side of the overlapping part.

7. The method according to claim 1, further comprising, prior to the forming the first folding part, installing a tether in such a manner that an upper side of the tether passes through the airbag seat and both sides of the tether are fixed to the inflator.

8. The method according to claim 7, wherein in the installing the tether, the tether passes through inactive regions of the airbag seat and is disposed on an inboard side of the airbag seat via the upper side of the airbag seat.

9. The method according to claim 8, wherein the inactive regions are formed at an inner side and an upper end of the airbag seat, respectively, such that the tether passes through the inactive regions.

\* \* \* \* \*